(12) United States Patent
Durrett et al.

(10) Patent No.: US 8,729,717 B2
(45) Date of Patent: May 20, 2014

(54) TURBOCOMPOUND FREE PISTON LINEAR ALTERNATOR

(75) Inventors: Russell P. Durrett, Bloomfield Hills, MI (US); Venkatesh Gopalakrishnan, Troy, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 13/277,321

(22) Filed: Oct. 20, 2011

(65) Prior Publication Data

US 2012/0112469 A1    May 10, 2012

Related U.S. Application Data

(60) Provisional application No. 61/410,342, filed on Nov. 4, 2010.

(51) Int. Cl.
*F02B 63/04*    (2006.01)
*H02K 7/18*    (2006.01)

(52) U.S. Cl.
USPC ............................................... 290/1 A

(58) Field of Classification Search
USPC ....... 290/1 A, 1 R, 1 E, 5; 123/3, 46 R, 46 A, 123/46 E
See application file for complete search history.

(56) References Cited

U.S. PATENT DOCUMENTS

| | | | |
|---|---|---|---|
| 2,355,924 A | 8/1944 | Pescara | |
| 3,234,395 A | 2/1966 | Colgate | |
| 6,554,585 B1 * | 4/2003 | Maracchi | 417/364 |
| 7,258,085 B2 * | 8/2007 | Niiyama et al. | 123/46 R |
| 7,694,518 B2 | 4/2010 | Whiting et al. | |

* cited by examiner

*Primary Examiner* — Javaid Nasri (57) ABSTRACT

A free piston linear alternator including a pair of pistons, each piston axially opposed from the other and generating electric current when linearly translating within the cylinder, a combustion chamber disposed between the pistons, a return mechanism configured to return the pistons to respective first positions from respective second positions after combustion; and an exhaust system fluidly coupled to the combustion chamber and including a power turbine transforming exhaust gas feedstream pressure into a mechanical output.

19 Claims, 4 Drawing Sheets

TURBOCOMPOUND FREE PISTON LINEAR ALTERNATOR

CROSS REFERENCE TO RELATED APPLICATIONS

This application claims the benefit of U.S. Provisional Application No. 61/410,342, filed on Nov. 4, 2010, which is incorporated herein by reference.

TECHNICAL FIELD

This disclosure is related to linear alternators utilizing opposed free pistons and power turbine devices transforming exhaust gas feedstream pressure into mechanical force.

BACKGROUND

The statements in this section merely provide background information related to the present disclosure. Accordingly, such statements are not intended to constitute an admission of prior art.

An alternator translates a mechanical input into an electrical current. It is known, for example, to utilize a belt driven shaft to provide an input to the alternator. Alternators utilize induction to generate electricity. It is known, for example, to generate electric current utilizing relative motion between permanent magnets and windings (i.e., coils) of electrically conductive wire to generate current. Different numbers of configurations of magnets and windings are utilized to different effect upon the generated current.

An exemplary linear alternator is a device that includes a stationary cylinder and a translating piston within the cylinder. By positioning a magnet or magnets upon one of a wall of the cylinder and the piston and the windings upon the other of the cylinder wall and the piston, linear translation of the pistons creates induction and a resulting flow of current from the windings.

An opposed piston engine includes a combustion chamber disposed between two pistons. As combustion occurs within the combustion chamber, the pistons are driven outward. The pistons are subsequently returned toward the center of the device in preparation for the next combustion event. Exemplary embodiments of an opposed piston engine includes free piston engines not having a crankshaft attached to the pistons.

SUMMARY

A free piston linear alternator including a pair of pistons, each piston axially opposed from the other and generating electric current when linearly translating within the cylinder, a combustion chamber disposed between the pistons, a return mechanism configured to return the pistons to respective first positions from respective second positions after combustion; and an exhaust system fluidly coupled to the combustion chamber and including a power turbine transforming exhaust gas feedstream pressure into a mechanical output.

BRIEF DESCRIPTION OF THE DRAWINGS

One or more embodiments will now be described, by way of example, with reference to the accompanying drawings, in which.

DETAILED DESCRIPTION

Figure 1:
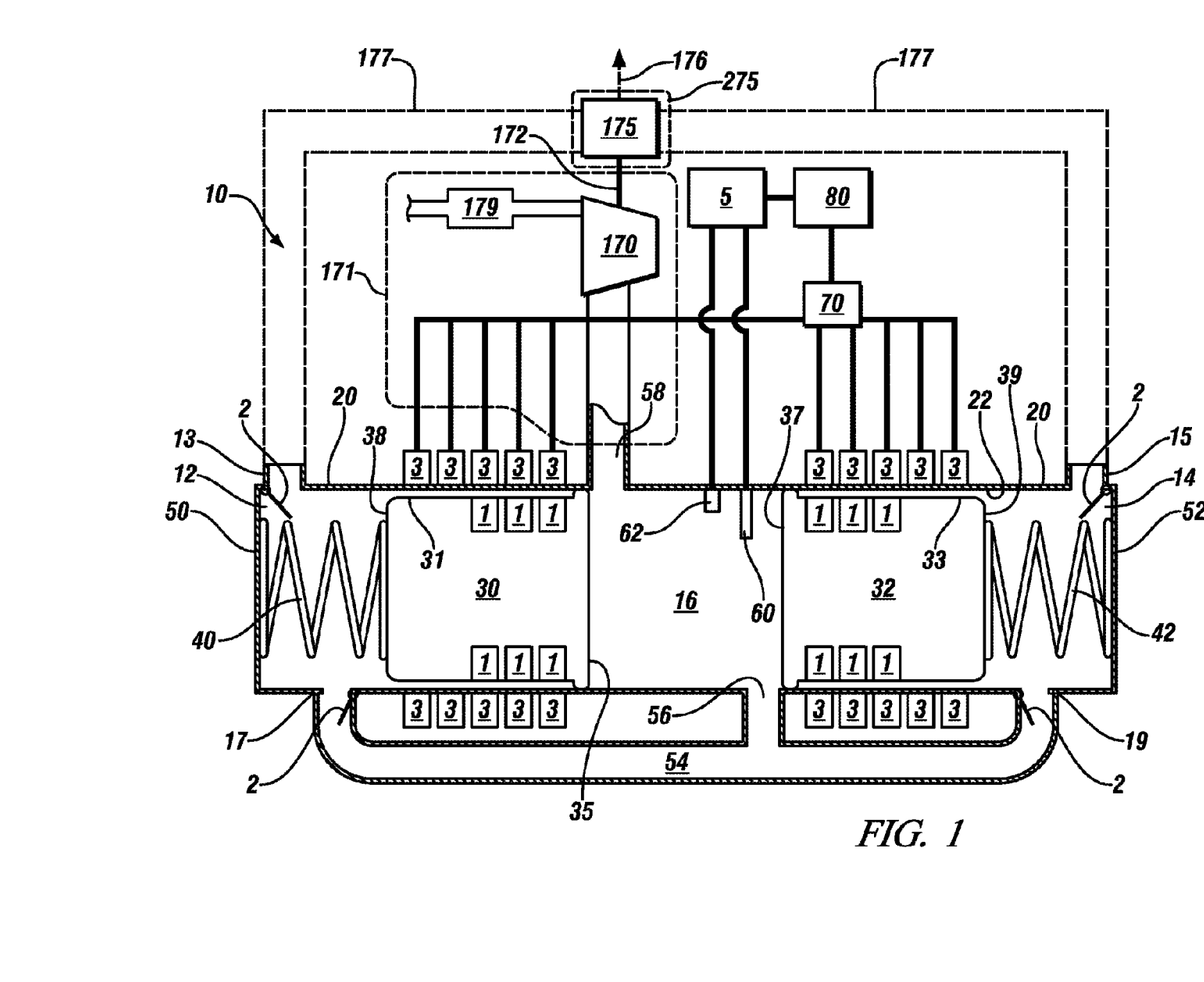
FIG. 1 illustrates a partial sectional view through an exemplary free piston linear alternator device utilizing opposed pistons with return members and a power turbine device transforming exhaust gas feedstream pressure into mechanical force in accordance with the present disclosure.

Referring now to the drawings, wherein the showings are for the purpose of illustrating certain exemplary embodiments only and not for the purpose of limiting the same, FIG. 1 illustrates a partial sectional view through an exemplary free piston linear alternator (FPLA) 10 that includes a cylinder 20 including first and second outer chambers 12,14, respectively, first and second opposed pistons 30,32, respectively, and a combustion chamber 16 disposed between the opposed pistons 30,32. Each of the outer chambers 12,14 are disposed between respective ones of the pistons 30,32 and a respective outer end 50,52 of the cylinder 20. The pistons 30,32 are axially opposed from each other and are configured to generate electric current when each of the pistons 30,32 linearly translate. First and second return members 40,42, respectively, are each disposed within respective ones of the outer chambers 12,14. The return members 40,42 are each configured to return each piston to a first position (e.g., inner dead center) from a second position (e.g., outer dead center) after a combustion event within the combustion chamber 16. The return members 40,42 can collectively be referred to as a return mechanism.

The return members 40,42 can be mechanical springs, pneumatic springs or hydraulic springs. However, the return members 40,42 are not limited to mechanical, pneumatic or hydraulic springs and can include any of several other spring-like devices that can be configured to store energy when compressed and utilize the stored energy to return and force each piston to the first position (e.g., inner dead center) from the second position (e.g., outer dead center) after a combustion event within the combustion chamber.

Figure 2:
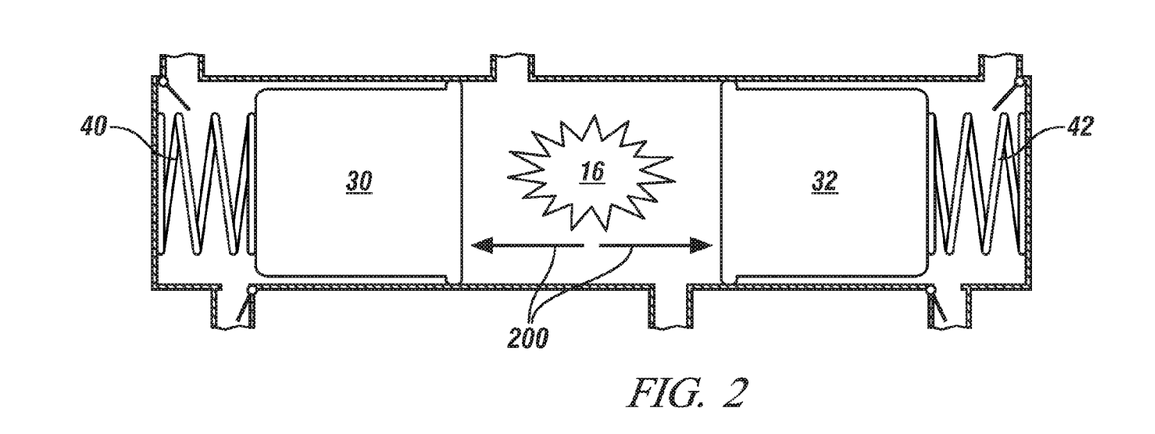
FIG. 2 illustrates the free piston linear alternator of FIG. 1 during a first stroke of the pistons driven by a combustion event from a first position toward a second position in accordance with the present disclosure.

Referring to FIG. 2, each piston 30,32 translating towards the second position during the first stroke is illustrated in accordance with an exemplary embodiment of the present disclosure. The pistons 30,32 driven by a combustion event translate toward the second position. Each of the pistons is driven by a combustion driving force 200 resulting from- or in response to-the combustion event. The second position of each of the pistons 30,32 corresponds to an outer dead center position. During the first stroke, each of the return members 40,42 store energy due to the respective driven pistons compressing each respective return member 40,42. In other words, each of the return members 40,42 store energy via compression when each piston 30,32 translates from the first position to the second position driven by said combustion.

Figure 3:
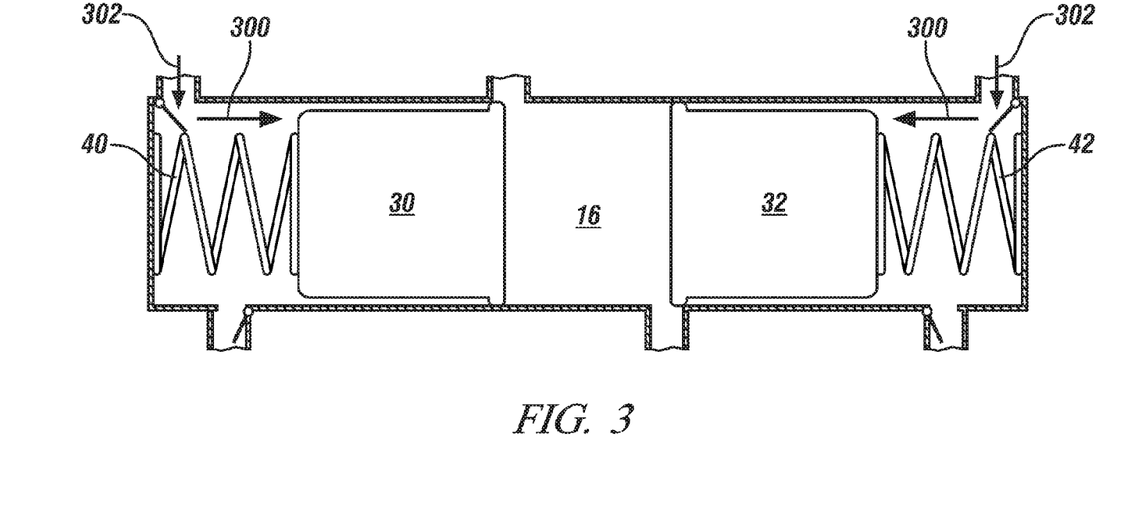
FIG. 3 illustrates the free piston linear alternator of FIG. 1 during a second stroke of the pistons returned by a biasing force provided by respective return members toward a first position from a second position in accordance with the present disclosure.

Referring to FIG. 3, each piston 30,32 translating towards the first position during the second stroke is illustrated in accordance with an exemplary embodiment of the present disclosure. The translation or piston return from the second position to the first position during the second stroke is achieved by a biasing force 300 provided by each of the return members 40,42. Each of the pistons 30,32 can be free pistons, therefore, each of the pistons is not connected to a crankshaft. The first position of each piston 30,32 can correspond to an inner dead center position (i.e., first position), where the inner dead center position is a natural resting position when no force is loaded upon the return members 40,42. During the second stroke, each of the return members 40,42 utilize the stored energy to apply the biasing force 300 to each respective piston 30,32, thereby forcing and returning the pistons 30,32 from the second position to the first position.

As illustrated in FIG. 1, each outer chamber 12,14 includes at least one respective inlet port 13,15 for receiving and channeling intake air into the respective outer chamber 12,14. Each inlet port can include a check valve 2 configured to allow intake air into each outer chamber. Specifically, the outer chambers 12,14 via the respective inlet ports 13,15 draw in the intake air when the pistons translate inward during the second stroke for eventual combustion within the combustion chamber 16. Hence, and with reference to FIG. 3, the outer chambers 12,14 receive drawn intake air 302 through a respective inlet port when each piston translates from the second position to the first position during the second stroke. The intake air can be charged with a forced induction device 175 such as a turbocharger or a supercharger to increase the pressure of the intake air and provide a boost pressure to the engine, thereby increasing the output that can be achieved by the FPLA 10. Charged intake air can be cooled by a charge air cooler to increase the density of the air. The forced induction device 175 will be discussed in further detail below with reference to an exhaust system 171.

The pistons 30,32 can be configured to compress the intake air within each respective outer chamber 12,14 when the pistons are driven outward during the first stroke by the combustion driving force 200, and thereby acting as a supercharger device. Hence, and with reference to FIG. 1, each outer chamber 12,14 directs the drawn inlet air through a respective outlet port 17,19 for eventual combustion within the combustion chamber 16 when each piston 30,32 translates from the first position to the second position during the second stroke. The compressed intake air is directed or pumped through the respective outlet port 17,19 of each respective outer chamber 12,14 into a common intake manifold 54 for use during a subsequent combustion cycle. Specifically, each of the outer chambers compress the intake air through each of the respective outlet ports 17,19 into the common intake manifold 54 coupling each respective outlet port 17,19 to an inlet 56 of the combustion chamber 16 when each of the pistons 30,32 translate from the first position to the second position. The compressed intake air within the common intake manifold 54 is at a pressure higher than the pressure of the intake air within each of the outer chambers 12,14.

The combustion chamber 16 illustrated in FIG. 1 is defined by a wall 22 of the cylinder 20 and each of the opposed pistons 30,32. Specifically, a respective plug portion 35,37 on each respective piston 30,32 separates the combustion chamber 16 from the respective outer chamber 12,14. In other words, each of the plug portions 35,37 function as a sealing surface for combustion events within the combustion chamber 16. Intake air (e.g., charge air) is drawn into the combustion chamber 16 from the common intake manifold 54 during the first stroke of the pistons 30,32 (i.e., FIG. 2). In an exemplary embodiment fuel is injected into the combustion chamber 16. Alternatively, fuel can be injected at the inlet port 56 or at a location within the common intake manifold 54. Subsequently, the fuel air charge is compressed by the returning of the pistons 30,32 provided by the biasing force 300 of each respective return member 40,42 (i.e., FIG. 3). The FPLA 10 is configured such that combustion occurs when the fuel air charge is compressed. In an exemplary embodiment of the present disclosure, leakage from either of the plug portions 35,37 can be scavenged into respective ones of the outer chambers 12,14 and subsequently drawn into the combustion chamber 16.

In an exemplary embodiment, the exhaust system 171 receives an exhaust gas feedstream from at least one exhaust port 58 of the combustion chamber 16 after a combustion event. Hence, the exhaust system 171 is fluidly coupled to the combustion chamber 16. In other words, the returning of each piston 30,32 inward provided by each respective return member 40,42 expels the exhaust gas feedstreem from the combustion chamber 16 into the exhaust system 171. The exhaust gas feedstream is characterized by an exhaust gas feedstream temperature, an exhaust gas feedstream pressure, and an exhaust gas feedstream mass flow rate. In an exemplary embodiment, the exhaust system 171 includes a power turbine device 170 and an aftertreatment device 179 or devices fluidly coupled via an exhaust manifold that can be used to treat constituents that can be in the exhaust gas feedstream, including NOx, CO, and trace hydrocarbons. In another embodiment, the exhaust system 171 does not include the aftertreatment device 179 where the exhaust gas flow can be directly expelled from the exhaust system to the ambient air.

The power turbine device 170 can transform the exhaust gas feedstream pressure into a mechanical output 172, e.g., via a turbine output rotary shaft. In other words, the pressure from the exhaust gas feedstream within the exhaust system 171 is transformed into the mechanical output 172 utilizing the power turbine device 170. In an exemplary embodiment, the power turbine device 170 can include a variable geometry turbine (VGT). The mechanical output 172 may power a load 275. In one embodiment, the load 275 includes a generator device. In one embodiment, the generator device can include a torque generator device such as a pulley or belt for powering vehicle accessories as indicated by dashed output line 176. In another embodiment, the generator device can include an electrical generator configured to transform the mechanical output to electrical energy as indicated by the dashed output line 176.

In an exemplary embodiment, the power turbine device 170 transforming the exhaust gas feedstream pressure into the mechanical output 172 includes the mechanical output powering a forced induction device (i.e., the load 175) such as one of a turbocharger and a supercharger configured to charge intake air within an intake system 177 to increase the pressure of the intake air for eventual combustion within the combustion chamber 16. The intake system 177 fluidly coupled to the intake ports 13,15 is indicated as a dashed line. In the exemplary embodiment, the intake system 177 is fluidly coupled to the at least one respective intake ports 13,15 of each of the outer chambers 12,14, respectively.

Figure 4:
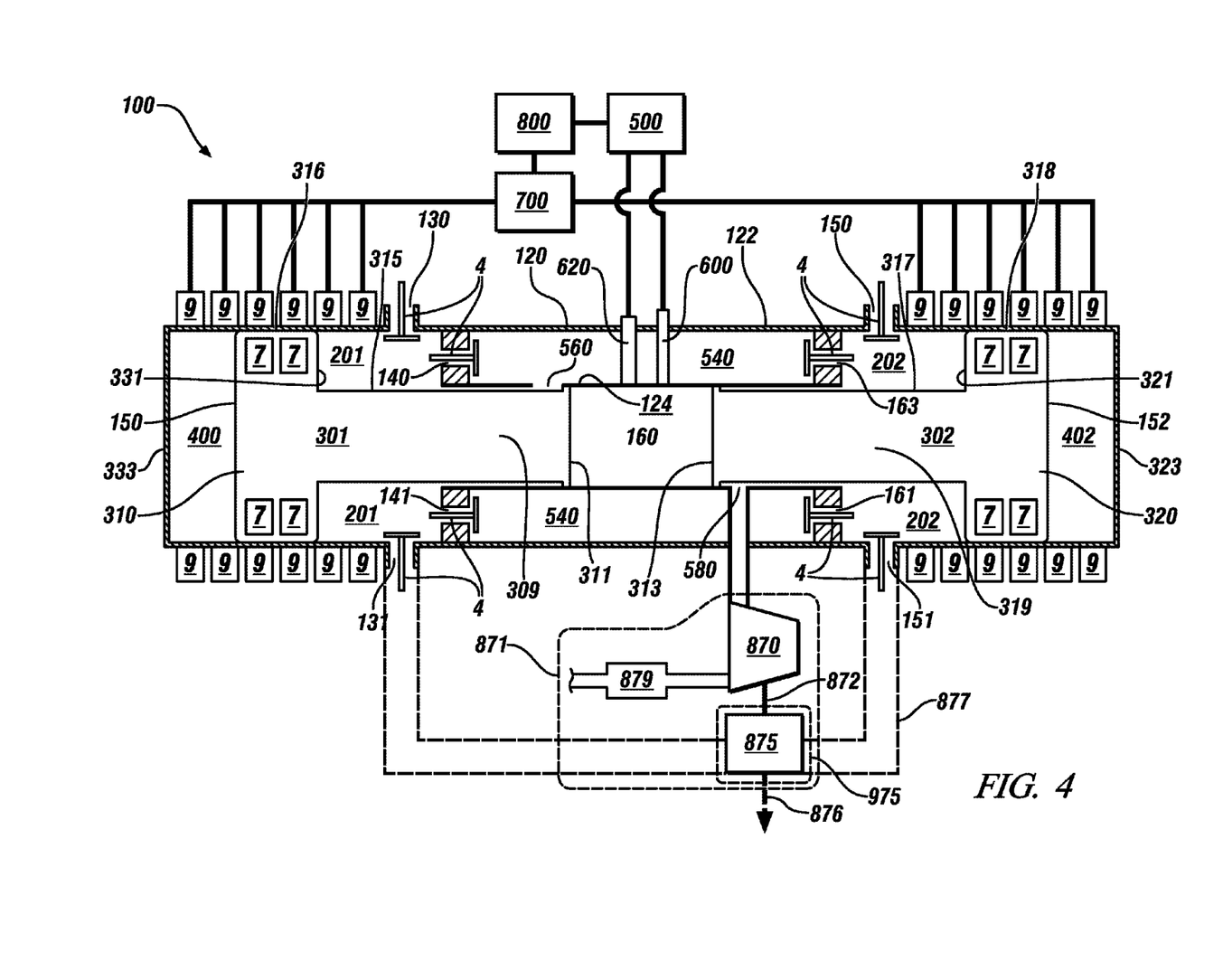
FIG. 4 illustrates a partial sectional view through an exemplary free piston linear alternator device utilizing opposed pistons with bounce chambers and a power turbine device transforming exhaust gas feedstream pressure into mechanical force in accordance with the present disclosure.

FIG. 4 illustrates a partial sectional view through an exemplary free piston linear alternator (FPLA) 100 that includes a cylinder 120 including first and second bounce chambers 400,402, respectively, first and second scavenging chambers 201, 202, respectively, first and second opposed pistons 301, 302, respectively, and a combustion chamber 160 disposed between the opposed pistons 301,302. The pistons 301,302 are axially opposed from each other and are configured to generate electric current when each of the pistons 301,302 linearly translate. Each of the bounce chambers 400,402 are disposed between respective ones of the pistons 301,302 and a respective outer end 333,323 of the cylinder 120. The bounce chambers 400,402 each include substantially constrained air configured to return respective ones of the pistons 301,302 to a first position (e.g., inner dead center) from a second position (e.g., outer dead center) after a combustion event within the combustion chamber 160. The bounce chambers 400,402 can further be referred to herein as gas springs. The bounce chambers 400,402 can also collectively be referred to as a return mechanism.

Figure 5:
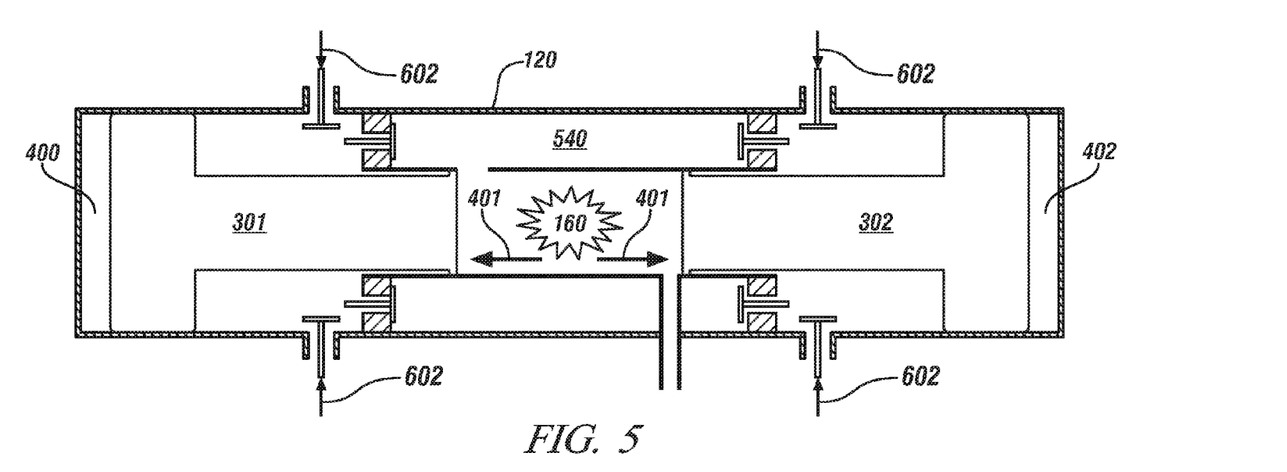
FIG. 5 illustrates the free piston linear alternator of FIG. 4 during a first stroke of the pistons driven by a combustion event from a first position toward a second position in accordance with the present disclosure.

Referring to FIG. 5, each piston 301,302 translating towards the second position during the first stroke is illustrated in accordance with an exemplary embodiment of the present disclosure. The pistons 301,302 driven by a combustion event translate toward the second position. Each of the pistons 301,302 are driven by a combustion driving force 401 resulting from the combustion event. The second position of each of the pistons 301,302 corresponds to an outer dead center position. During the first stroke, the substantially constrained air within each of the bounce chambers 400,402 is compressed when each piston translates from the first position to the second position driven by said combustion event.

Figure 6:
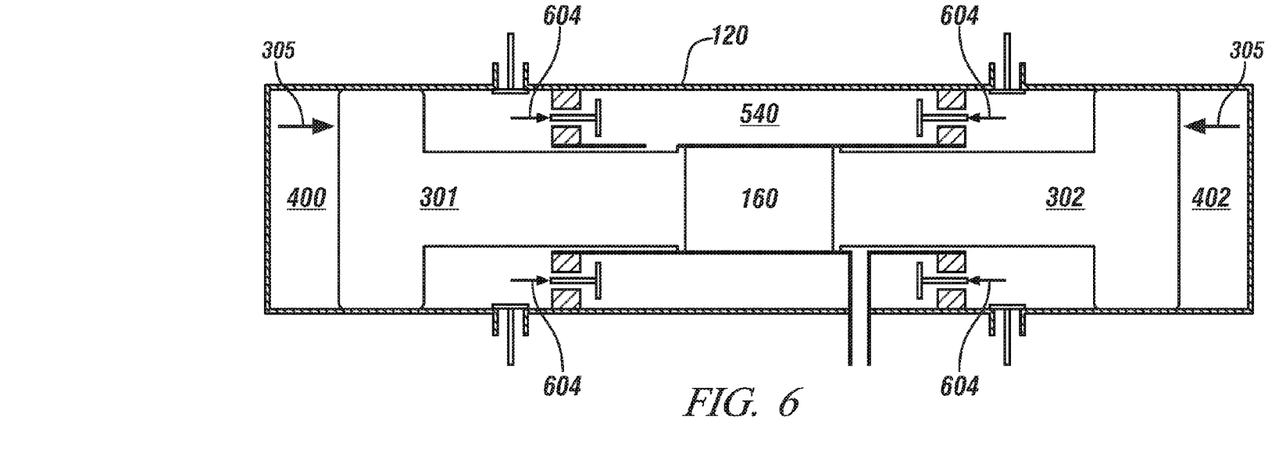
FIG. 6 illustrates the free piston linear alternator of FIG. 4 during a second stroke of the pistons returned by a return force provided by compression within respective bounce chambers toward a first position from a second position in accordance with the present disclosure.

Referring to FIG. 6, each of the pistons 301,302 translating towards the first position during the second stroke is illustrated in accordance with an exemplary embodiment of the present disclosure. The translation or piston return from the second position to the first position during the second stroke is achieved by a return force 305 provided by compression within respective bounce chambers 400,402. In other words, the compressed substantially constrained air within each of the bounce chambers 400,402 is utilized to exert the return force 305 on each respective piston 301,302 to return each respective piston 301,302 to the first position from the second position. Each of the pistons 301,302 can be free pistons, therefore, each of the pistons are not connected to a crankshaft. The first position of each piston 301,302 can correspond to an inner dead center position (i.e., first position), where the inner dead center position is a natural resting position when the substantially constrained air within each respective bounce chamber 400,402 is not compressed.

As illustrated in FIG. 4, the pair of opposed pistons 301, 302 each have a respective head portion 310,320 and a respective slide portion 309,319. The combustion chamber is disposed between proximate ends 311,313 of the respective slide portions 309,319, respectively. The first scavenging chamber 201 is disposed between a cylinder outer wall 122, an outer wall 315 of the slide portion 309 of the first piston 301 and a proximate end 331 of the head portion 310 of the first piston 301. The head portion 310 of the first piston 301 having the proximate end 331 adjacent to the first scavenging chamber 201 and a distal end 150 adjacent to the first bounce chamber 400 can thereby form a seat between the first scavenging chamber 201 and the first bounce chamber 400. Similarly, the second scavenging chamber 202 is disposed between the cylinder outer wall 122, an outer wall 317 of the slide portion 319 of the second piston 302 and a proximate end 321 of the head portion 320 of the second piston 302. The head portion 320 of the second piston 302 having the proximate end 321 adjacent to the second scavenging chamber 202 and a distal end 152 adjacent to the second bounce chamber 402 can thereby form a seat between the second scavenging chamber 202 and the second bounce chamber 402. Hence, each scavenging chamber 201,202 is disposed between a cylinder wall 122, a respective outer wall 315,317 of the respective slide portion 309,319 of each respective piston 301,302 and a respective proximate end 331,321 of the respective head portion 310,320 of each respective piston 301,302. The head portion 310,320 of each respective piston 301,302 having the respective proximate end 331,321 adjacent to the respective scavenging chamber 201,202 and a respective distal end 150, 152 adjacent to the respective bounce chamber 400,402 thereby forming a seat between respective ones of the scavenging chambers 201,202 and respective ones of the bounce chambers 400,402.

Each scavenging chamber 201,202 includes at least one respective inlet port 130,131,150,151, for receiving and channeling intake air into the respective scavenging chambers 201,202. Each scavenging chamber 201,202 includes at least one respective outlet port 140,141,160,161 for delivering the intake air for eventual combustion within the combustion chamber 160. The inlet and outlet ports can each include a check valve 4 configured to allow intake air into each scavenging chamber 201,202 and configured to deliver the intake air out of each scavenging chamber 201,202.

Referring to FIGS. 4 and 5, the first scavenging chamber 201 draws intake air 602 through at least one respective scavenging inlet port 130 and/or 131 when the first piston 301 translates from the first position to the second position during the first stroke. Similarly, the second scavenging chamber 202 draws intake air 602 through at least one respective scavenging inlet port 150 and/or 151 when the second piston 302 translates from the first position to the second position during the first stroke. In one embodiment, the drawn intake air 602 into the first and second scavenging chambers 201,202 can be naturally aspirated ambient air. In another embodiment, the intake air 602 can be charged with a turbocharger or a supercharger to increase the pressure of the intake air and provide a boost pressure to the engine, thereby increasing the output that can be achieved by the FPLA 100. In another embodiment, the intake air can be charged with a forced induction device 875 such as a turbocharger or a supercharger to increase the pressure of the intake air and provide a boost pressure to the engine, thereby increasing the output that can be achieved by the FPLA 100. Charged intake air can be cooled by a charge air cooler to increase the density of the air. The forced induction device 875 will be discussed in further detail below with reference to an exhaust system 871.

With reference to FIGS. 4 and 6, the first scavenging chamber 201 delivers the intake air (e.g., delivered intake air 604) through at least one respective scavenging outlet port 140,141 for eventual combustion within the combustion chamber 160 when the first piston 301 translates from the second position to the first position during the second stroke. Similarly, the second scavenging chamber 202 delivers the drawn intake air (e.g., delivered intake air 604) through at least one respective scavenging outlet port 163,161 for eventual combustion within the combustion chamber 160 when the second piston 302 translates from the second position to the first position during the second stroke.

In an exemplary embodiment with reference to FIGS. 4-6, each scavenging chamber 201,202 delivers or pumps the drawn intake air through at least one scavenging outlet port 140,141,163,161 into a reservoir chamber 540 when each of the pistons translate from the second position to the first position. The reservoir chamber 540 fluidly coupling each scavenging chamber 201,202 to at least one combustion chamber inlet port 560 of the combustion chamber 160. The delivered intake air 604 within the reservoir chamber 540 can be drawn into the combustion chamber 160 as supercharged air during a scavenging period when the pistons are in the second position. It The scavenging period provides supercharged air from the each scavenging chamber 201,202 to the combustion chamber 160 via the reservoir chamber 540 when the pistons 301,302 are in the second position. This disclosure is not limited to a single reservoir chamber 540 and could include more than one reservoir chamber. In an alternative embodiment, an intake manifold fluidly coupling each of the scavenging chambers 201,202 to the combustion chamber 160 could be utilized in place of the reservoir chamber 540.

The combustion chamber 160 illustrated in FIG. 4 is defined by an inner wall 124 of the cylinder 120 and each of the respective proximate ends 311,313 of the slide portions 309,319 of each of the respective pistons 301,303. Each of the slide portions 309,319 may include a respective plug portion located on the respective proximate ends 311,313 that separates the combustion chamber 160 from the rest of the region within the cylinder 120. In other words, each of the plug portions function as a sealing surface for combustion events within the combustion chamber 160. Intake air (e.g., charge air) is drawn into the combustion chamber 160 from the reservoir chamber 540 during the scavenging period when the pistons 301,302 are in the second position. In an exemplary embodiment fuel is injected into the combustion chamber 160. Alternatively, fuel can be injected at the combustion chamber inlet port 560 or at a location within the reservoir chamber 540. Subsequently, the fuel air charge is compressed by the returning of the pistons 301,302 provided by the return force 305 exerted by the compressed substantially constrained air within each of the bounce chambers 400,402 (i.e., FIG. 4). The FPLA 100 is configured such that combustion occurs when the fuel air charge is compressed. In an exemplary embodiment of the present disclosure, leakage from either of the slide portions 309,319 can be scavenged into respective ones of the scavenging chambers 201,202, or the reservoir chamber 540, and subsequently drawn into the combustion chamber 160.

In an exemplary embodiment, the exhaust system 871 receives an exhaust gas feedstream from at least one exhaust port 580 of the combustion chamber 160 after a combustion event. In other words, the combustion chamber scavenging period which occurs when the pistons are located at the second position expels the exhaust gas from the combustion chamber 160 into the exhaust system 871. Hence, the exhaust system 871 is fluidly coupled to the combustion chamber 160. The exhaust gas feedstream is characterized by an exhaust gas feedstream temperature, an exhaust gas feedstream pressure, and an exhaust gas feedstream mass flow rate. In an exemplary embodiment, the exhaust system 871 includes a power turbine 870 and an aftertreatment device 879 or devices in fluid communication via an exhaust manifold that can be used to treat constituents that can be in the exhaust gas feedstream, including NOx, CO, and trace hydrocarbons. In another embodiment, the exhaust system 871 does not include the aftertreatment device 879 where the exhaust gas flow can be directly expelled from the exhaust system to the ambient air.

The power turbine 870 can transform the exhaust gas feedstream pressure into a mechanical output 872, e.g., via a turbine output rotary shaft. In other words, the pressure from the exhaust gas feedstream within the exhaust system 871 is transformed into the mechanical output 872 utilizing the power turbine 870. In an exemplary embodiment, the power turbine 870 can include a variable geometry turbine (VGT). The mechanical output 872 may power a load 975. In one embodiment, the load 875 includes a generator. In one embodiment, the generator can include a torque generator such as a pulley or belt for powering vehicle accessories as indicated by dashed output line 876. In another embodiment, the generator can include an electrical generator configured to transform the mechanical output 872 to electrical energy as indicated by the dashed output line 876.

In another exemplary embodiment, the power turbine 870 transforming the exhaust gas feedstream pressure into the mechanical output 872 includes the mechanical output 872 powering a forced induction device (i.e., the load 875) such as one of a turbocharger and a supercharger configured to charge intake air within an intake system 877 to increase the pressure of the intake air for eventual combustion within the combustion chamber 160. The intake system 877 is indicated as a dashed line. In the exemplary embodiment, the intake system 877 is fluidly coupled to the at least one respective intake ports 131,151 of each of the scavenging chambers 201,202, respectively.

Referring to FIGS. 1 and 4, the combustion event within the combustion chamber 16 or 160 occurs in a two stroke cycle and said linear translation of each piston 30,32 or 301,302 includes a first stroke of each piston 30,32 or 301,302 from the first position to the second position driven by said combustion and a second stroke of each piston 30,32 or 301,302 from the second position to the first position in preparation for a subsequent combustion event. In one embodiment, with reference to FIGS. 1 and 3, the second stroke utilizes stored energy within the return members 40,42 to force and return each respective piston 30,32 from the second position to the first position. In another embodiment, with reference to FIGS. 4 and 6, the second stroke utilizes the compressed substantially constrained air within each of the bounce chambers 400,402 to exert the return force 305 on each respective piston 301,302 to return each piston from the second position to the first position.

The FPLA 10 or 100 includes one or more fuel injectors 60 or 600. In an engine configured to operate through direct injection, a fuel injector 60 or 600 is supplied with high pressure fuel through a fuel rail or other device. In a direct injection engine, the fuel is sprayed directly into the combustion chamber 16 or 160. Other configurations are known wherein fuel can be injected into intake port or ports and drawn into the combustion chamber 16 or 160 with the intake air. For instance, fuel could be injected at the combustion chamber inlet port 56 or 560 or at some location within the common intake manifold 54 or reservoir chamber 540. Fuel injectors are configured to spray or atomize the fuel in order to facilitate efficient mixing and combustion of the fuel within the combustion chamber 16 or 160.

As aforementioned the combustion chamber 16 or 160 includes one or more inlet ports 56 or 560, respectively. The combustion chamber 16 or 160 further includes one or more exhaust ports 58 or 580, respectively. Generally, intake ports channel charged air (e.g., intake air) by translating pistons to supercharge and compress intake air within each of the outer chambers 12,14 or the scavenging chambers 201,202, into the combustion chamber 16 or 160, respectively. Exhaust ports receive exhaust gas from the combustion chamber 16 or 160 after a combustion event and channel the exhaust gas into the exhaust system 171 or 871, respectively.

A number of combustion modes are known in the art, and the FPLA 10 or 100 is envisioned to utilize any number of combustion modes. The FPLA can be configured to utilize diesel fuel for combustion. Combustion of diesel fuel can be controlled through compression ignition, where the fuel-air charge is compressed to a point wherein the charge ignites without a spark. Such configurations are known to additionally include a glow plug to assist in conditions wherein temperatures or other factors might make misfires or partial combustion of the charge possible. Additionally, diesel engines are known to utilize a premixed charge compression ignition mode (PCCI) including a high ratio of charge air to fuel or lean operation that can increase fuel economy of the engine. Alternatively, other fuels and engine configurations can be utilized including gasoline and ethanol blend fuels. As depicted in FIGS. 1 and 4, such a configuration can include a spark plug 62 or 620 to provide spark at a particular timing to ignite the charge. Additionally, combustion modes are known including a stratified charge spark ignition mode and a homogeneous charge compression ignition (HCCI) mode. Stratified charge spark ignition mode can use a concentration of fuel within a particular portion of the combustion chamber 16 or 160 in combination with a timed spark from the spark plug to provide efficient combustion and force to the piston. HCCI mode includes operation with a high ratio of charge air to fuel or lean operation that can increase fuel economy of the engine. A number of fuels and combustion modes can be utilized within the engine. This disclosure is not intended to be limited to the particular exemplary embodiments provided herein.

As aforementioned, each pair of opposed pistons 30,32 and 301, 302 generate electric current during each of the first and second strokes. The pistons 30,32 of the FPLA 10 includes a first element 1 interacting with a second element 3 located on the wall 22 of the cylinder 20 where translation of each piston between the first position and the second position generates the electric current. Similarly, a first element 7 is located on the head portion 310,320, of each piston 301,302, respectively, and a second element 9 is located on the cylinder outer wall 122 of the cylinder 120 where translation of each piston between the first position and the second position generates the electric current. It will be understood that translation of each piston between the first position and the second position also includes translation between the second position and the first position generating the electric current. In exemplary embodiments of the present disclosure, the first element includes a permanent magnet and the second element includes a winding. The windings include wires emanating from the windings in order to deliver the electric current to an associated rectifier 70 or 700. The rectifier 70 or 700 is electrically coupled to a battery 80 or 800, respectively, for storing the generated current. By placing the permanent magnets on the pistons 30,32 or 301,302, no wires no wires need to be attached to the translating pistons. Alternative embodiments include the first element 1 or 7 including the winding and the second element 3 or 9 including the permanent magnet. In other words, the first element of the FPLA 10 or 100 includes one of a permanent magnet and a winding, and the second element includes the other one of the permanent magnet and the winding.

Heat is generated within the combustion chamber 16 or 160. Permanent magnets can be adversely affected by high temperatures. As a result, it can be beneficial to configure the piston such that the permanent magnets (i.e., first element 1 or 7) are not exposed to high temperatures. Such configuration can take a number of embodiments. For example, as illustrated in FIG. 1, the pistons 30,32 are located to interact with and compress the mass air flow of intake air being drawn into the outer chambers 12,14 of the FPLA 10. In another example, as illustrated in FIG. 4, the pistons 301,302 are located to interact with and compress the mass air flow of intake air being drawn into the scavenging chambers 201,202 of the FPLA 100. Such scavenging configurations illustrated in FIGS. 1 and 4 can utilize the intake mass airflow into each of the outer chambers 12,14 or scavenging chambers 201,202 to cool each respective piston 30,32 or 301,302, respectively, and the permanent magnets (i.e., first element) by the mass air flow through the outer chambers 12,14 or the scavenging chambers 201,202, respectively. Features upon the piston can be selected such that heat transfer from the piston to the intake air is maximized. In an exemplary embodiment of the present disclosure, a respective wall 31,33 or 316,318 of each piston 30,32 or of the respective head portion 310,320 of each respective piston 301,302, respectively is thinned to maximize heat transfer from the first element 1 or 7. In another exemplary embodiment, each piston 30,32 or 301,302 is substantially hollow maximizing heat transfer from the first element 1 or 7 and reducing mass of each of the pistons. In another exemplary embodiment, heat transfer through each of the pistons 30,32 can be maximized or facilitated utilizing a series of fins coupled to respective outboard ends 38,39 of the respective pistons 30,32, respectively, interacting with the drawn intake air within each of the outer chambers 12,14. Further, engine coolant or other fluids can be used in a heat exchanger design jacketed around the FPLA 10 or 100 for additional heat transfer away from the FPLA 10 or 100. Further, materials for the pistons can be selected to impact the heat transfer properties of each of the pistons 30,32 or 301, 302. In an exemplary embodiment, steel can be utilized. In an alternative embodiment, aluminum can be utilized. In another alternative embodiment, a ceramic material can be utilized that reduces the amount of heat that is transferred from the combustion chamber 16 or 160 to the first element 1 or 7. It will be understood that a number of different materials can be utilized, and the disclosure is not intended to be limited to the particular exemplary embodiments disclosed herein.

Free piston engines do not include high magnitude lateral forces within the combustion chamber 16 or 160 as when a piston is connected to a crankshaft. As a result, certain embodiments of piston designs can be utilized that do not require seals or piston rings between the pistons 30,32 or 301,302 and the cylinder wall 22 (or the cylinder outer wall 122 or the cylinder inner wall 124). Such embodiments additionally reduce the heat generated within the FPLA and can reduce the temperatures experienced by the permanent magnets.

Piston mass can affect operation of the FPLA 10 illustrated in FIGS. 1-3. For instance, the combustion force 200 required to drive each of the pistons 30,32 and oscillation frequencies within the pistons 30,32 are affected by piston mass. Likewise, the biasing force 300 required to return each piston to inner dead center (e.g., the first position) is affected by piston mass. Similarly, with reference to the FPLA 100 illustrated in FIGS. 4-6, the combustion force 401 required to drive each of the pistons 301,302 and oscillation frequencies within the pistons 301,302 are affected by piston mass. Likewise, the return force 305 required to return each piston to inner dead center (e.g., the first position) is affected by piston mass.

As aforementioned, the electric current generated within the FPLA is created within the windings (i.e., second element 3 or 9). The wires transmit the electric current to the rectifier 70 or 700. The generated electric current is an alternating current. The rectifier 70 or 700 can be utilized to transform the electric current from alternating current to direct current and thereby stored as energy within the battery 80 or 800, respectively.

Referring to FIGS. 1-3, when a combustion event drives each of the pistons 30,32 to the outer dead center position (i.e., second position), respective ones of the return members 40,42 are compressed between respective ones of the outboard ends 38,39 and respective ones of the outer ends 50,52 of the cylinder 20. In an exemplary embodiment of the present disclosure, each of the return members 40,42 can be mechanically coupled to respective ones of the outboard ends 38,39 of each respective piston 30,32. In another exemplary embodiment of the present disclosure, each of the return members 40,42 can be mechanically coupled to respective ones of the outer ends 50,52 of the cylinder 20. Hence, each of the return members 40,42 can be mechanically coupled to one of respective ones of the outboard ends 38,39 of each respective piston 30, 32 and respective ones of the outer ends 50, 52 of the cylinder. In an alternative embodiment of the present disclosure, each of the return members 40,42 can be freely disposed within respective ones of the outer chambers 12, 14 and therefore not mechanically coupled to any feature within the cylinder.

With reference to FIGS. 1-3, an exemplary embodiment of the present disclosure, the compression ratio within the combustion chamber 16 can be affected by modulating the biasing force 300 provided by the return members 40,42. In an exemplary embodiment of the present disclosure, the biasing force 300 provided by the return members 40,42 can be modulated by adjusting the spring constant of at least one of the return members 40,42. In another exemplary embodiment, the biasing force 300 can be modulated by one of lengthening and shortening a distance from the center of the combustion chamber 16 to each of the outer ends 50,52 of the cylinder 20. The one of lengthening and shortening the distance can be provided by axially adjusting the outer ends 50,52 of the cylinder utilizing at least one of a number of methods including, but not limited to, hydraulic actuation, pneumonic actuation and electric actuation.

With reference to FIGS. 4-6, an in an exemplary embodiment of the present disclosure, a compression ratio within the combustion chamber 160 can be affected by adjusting the return force 305 provided by the compressed substantially constrained air within the bounce chambers 400,402. In one exemplary embodiment, the return force 305 can be adjusted or modulated by varying a mass of constrained air (i.e., constrained air mass) within at least one of the bounce chambers 400,402. In one embodiment, adjusting the constrained air mass within at least one of the bounce chambers 400,402 can include increasing air into the respective bounce chamber 400,402. In another embodiment, adjusting the constrained air mass within at least one of the bounce chambers 400,402 can include releasing a portion of the substantially constrained air out of the respective bounce chamber 400,402.

In another exemplary embodiment, a phasing of the linear translation of at least one of the pistons 301,302 can be adjusted in accordance with affecting the compression ratio within the combustion chamber 160 by the adjusting the return force 305 by varying the constrained air mass within at least one of the bounce chambers 400,402.

Referring to FIGS. 1 and 4, control module 5 and 500 are utilized to control various portions of the FPLA. Control modules 5 and 500 can control a fuel flow rate into the combustion chambers 16 and 160, respectively, affecting the output of the FPLA. Control modules 5 and 500 can increase or decrease electrical resistance applied to the electric circuit, thereby affecting how much current is drawn from the FPLA. Such a modulation of the current drawn from the FPLA can affect the electric power that is delivered to the rectifiers 70 and 700. Further, modulation of the current drawn from the FPLA can modulate the force created by induction upon the pistons 30,32 and 301,302 thereby affecting the cycling of the pistons 30,32 and 301,302 and combustion within the combustion chambers 16 and 160.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The FPLAs 10, 100 as described herein can be utilized singly in an exemplary embodiment of the present disclosure. In an alternative embodiment, FPLAs can be utilized in pairs or in banks. Depending upon the overall requirements of the entire configuration, individual FPLAs or groups of FPLAs can be selectively activated or deactivated. Each FPLA can be individually balanced, with opposing pistons operating in equal and opposite translations, so configurations can be utilized that do not require operation of the FPLAs to be maintained in pairs.

The FPLAs 10 and 100 include fewer moving parts than other known engine configurations. Further, as described herein, a configuration can be utilized not requiring pistons rings. As a result of fewer moving parts and the elimination of piston rings, heat generation in the FPLA may be reduced and engine efficiency may be increased.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A free piston linear alternator comprising:
   a pair of pistons, each piston axially opposed from the other within a cylinder, wherein each piston includes a respective first element configured to interact with a respective second element located on a wall of the cylinder to generate electric current stored as energy in a battery when the pistons linearly translate within the cylinder;
   a combustion chamber disposed between the pistons;
   a return mechanism configured to return the pistons to respective first positions from respective second positions after combustion;
   an intake system fluidly coupled to the combustion chamber for providing intake air for eventual combustion within the combustion chamber;
   an exhaust system fluidly coupled to the combustion chamber and comprising a power turbine transforming exhaust gas feedstream pressure into a mechanical output; and the mechanical output powering a forced induction device configured to charge the intake air within the intake system to increase the pressure of the intake air prior to being received at the combustion chamber.

2. The free piston linear alternator of claim 1 wherein the return mechanism comprises a pair of bounce chambers, each bounce chamber disposed between a respective piston and a respective outer end of the cylinder, each bounce chamber comprising substantially constrained air configured to return the respective piston to the respective first position from the respective second position.

3. The free piston linear alternator of claim 2 wherein the substantially constrained air within each of the bounce chambers is compressed when the corresponding piston translates from the respective first position to the respective second position and said compressed substantially constrained air exerts a return force on the corresponding piston to return the corresponding piston to the respective first position from the respective second position.

4. The free piston linear alternator of claim 2, further comprising:
each of the pistons having a respective head portion and a respective slide portion, the combustion chamber disposed between respective proximate ends of the respective slide portions of the pistons; and
a pair of scavenging chambers, each scavenging chamber disposed between a cylinder outer wall, a respective outer wall of the respective slide portion of each respective piston and a respective proximate end of the respective head portion of each respective piston, the head portion of each respective piston having the respective proximate end adjacent to the respective scavenging chamber and a respective distal end adjacent to the respective bounce chamber thereby forming a seat between the respective scavenging chamber and the respective bounce chamber.

5. The free piston linear alternator of claim 4 wherein each scavenging chamber draws intake air through at least one respective scavenging inlet port when the corresponding piston translates from the respective first position to the respective second position, and each scavenging chamber delivers the drawn intake air through at least one respective scavenging outlet port into a reservoir chamber when the corresponding piston translates from the respective second position to the respective first position, the delivered intake air within the reservoir chamber drawn into the combustion chamber during a scavenging period when the pistons are in the respective second positions.

6. The free piston linear alternator of claim 1, further comprising:
a pair of outer chambers, each outer chamber disposed between a respective piston and a respective outer end of the cylinder; and
said return mechanism comprising a pair of return members, each return member disposed within a respective outer chamber, each return member configured to return the respective piston to the respective first position from the respective second position after combustion.

7. The free piston linear alternator of claim 6 wherein each outer chamber draws intake air through a respective inlet when the corresponding piston translates from the respective second position to the respective first position, and wherein each outer chamber expels the drawn intake air through a respective outlet when the corresponding piston translates from the respective first position to the respective second position.

8. The free piston linear alternator of claim 1 wherein said combustion occurs in a two stroke cycle and said linear translation of each piston comprises a first stroke of each piston from the respective first position to the respective second position driven by said combustion and a second stroke of each piston from the respective second position to the respective first position.

9. The free piston linear alternator of claim 1 wherein the forced induction device comprises one of a turbocharger and a supercharger.

10. The free piston linear alternator of claim 1 wherein the first elements comprise one of permanent magnets and windings, and the second elements comprise the other one of permanent magnets and the windings.

11. The free piston linear alternator of claim 1 wherein the power turbine comprises a variable geometry turbine.

12. The free piston linear alternator of claim 1 wherein the power turbine transforming exhaust gas feedstream pressure into the mechanical output further comprises the mechanical output powering a generator.

13. The free piston linear alternator of claim 12, wherein the generator comprises an electrical generator.

14. The free piston linear alternator of claim 12, wherein the generator comprises a torque generator.

15. Method for controlling a free piston linear alternator having a pair of opposed pistons and a combustion chamber disposed between the opposed pistons, comprising:
driving each piston outward from a respective inner dead center position to a respective outer dead center position in response to a combustion event;
returning each piston inward from the respective outer dead center position to the respective inner dead center position in preparation for a subsequent combustion event;
providing intake air for eventual combustion within the combustion chamber from an intake system fluidly coupled to the combustion chamber;
expelling an exhaust gas feedstream from the combustion chamber into an exhaust system;
transforming a pressure from the exhaust gas feedstream within the exhaust system into a mechanical output utilizing a power turbine;
the mechanical output powering a forced induction device configured to charge the intake air within the intake system to increase the pressure of the intake air prior to being received at the combustion chamber; and
generating electric current to be stored as energy in a battery when each piston translates within a cylinder between the respective inner dead center position and the respective outer dead center position, each piston comprising one of a permanent magnet and a winding interacting with the other one of the permanent magnet and the winding located on a wall of the cylinder to generate the electric current as each piston translates.

16. The method of claim 15 wherein said mechanical output further powers a torque generator.

17. The method of claim 15 wherein said mechanical output further powers an electrical generator.

18. The method of claim 15 wherein said forced induction device comprises one of a turbocharger and a supercharger.

19. A free piston linear alternator comprising:
a pair of pistons and a combustion chamber disposed between the pistons, said pistons axially opposed from each other within a cylinder and each including a respective first element configured to interact with a respective second element located on a wall of the cylinder to generate electric current stored as energy in a battery when each of the pistons linearly translates within the cylinder;

a return mechanism configured to return the pistons to respective first positions from respective second positions after combustion, the return mechanism comprising one of a pair of bounce chambers, each bounce chamber disposed between a respective piston and a respective outer end of the cylinder, each bounce chamber comprising substantially constrained air configured to return the respective piston to the respective first position from the respective second position, and a pair of return members, each return member disposed within a respective outer chamber, each outer chamber disposed between a respective piston and a respective outer end of the cylinder, each return member configured to return the respective piston to the respective first position from the respective second position after combustion;

an intake system fluidly coupled to the combustion chamber for providing intake air for eventual combustion within the combustion chamber; and an exhaust system fluidly coupled to the combustion chamber and comprising a power turbine device transforming exhaust gas feedstream pressure into a mechanical output, the mechanical output powering one of a torque generator, an electrical generator and one of a turbocharger and a supercharger configured to charge intake air within an intake system to increase the pressure of the intake air prior to being received at the combustion chamber.

* * * * *